(No Model.) 2 Sheets—Sheet 1.

W. H. WINSLOW.
MOUNTING PRISM TILES.

No. 586,256. Patented July 13, 1897.

Witnesses:—
A. R. Appleman
Oliu H. Basquin

Inventor:
William H. Winslow
By Francis W. Parker, Atty.

THE NORRIS PETERS CO., PHOTO-LITHO., WASHINGTON, D. C.

(No Model.) 2 Sheets—Sheet 2.

W. H. WINSLOW.
MOUNTING PRISM TILES.

No. 586,256. Patented July 13, 1897.

Fig. 7¹.

Witnesses:
A. R. Appleman Jr.
Olin H. Basquin

Inventor:
William H. Winslow
By Travers W. Parker,
Atty.

UNITED STATES PATENT OFFICE.

WILLIAM H. WINSLOW, OF CHICAGO, ILLINOIS, ASSIGNOR TO THE LUXFER PRISM PATENTS COMPANY, OF SAME PLACE.

MOUNTING PRISM-TILES.

SPECIFICATION forming part of Letters Patent No. 586,256, dated July 13, 1897.

Application filed March 18, 1897. Serial No. 628,101. (No model.)

*To all whom it may concern:*

Be it known that I, WILLIAM H. WINSLOW, a citizen of the United States, residing at Chicago, in the county of Cook and State of Illinois, have invented certain new and useful Improvements in Mounting Prism-Tiles, of which the following is a specification.

My invention relates to improvements in mounting prism-tiles; and its particular object is to produce what I have called a "combination" prism-tile to furnish a new and larger unit for the construction of prism-pavements.

My invention is illustrated in the accompanying drawings, wherein—

Figure 1:
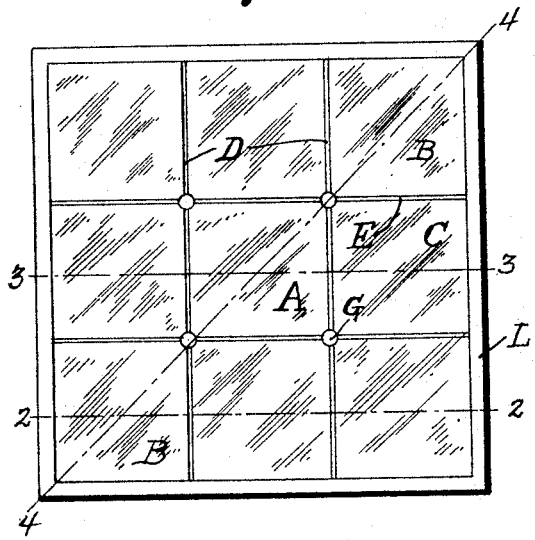
Figure 2:
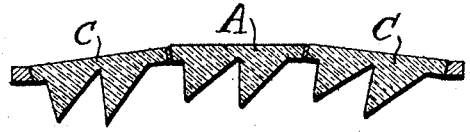
Figure 3:
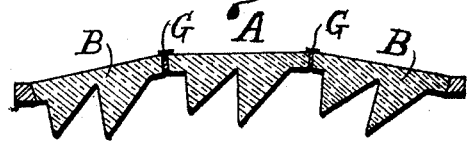
Figure 4:
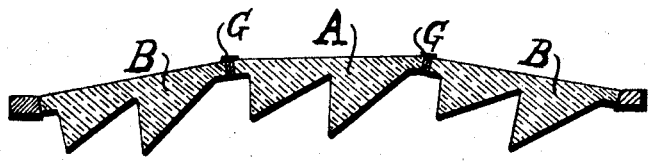
Figure 6:
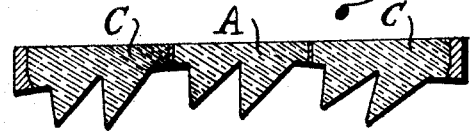
Figure 5:
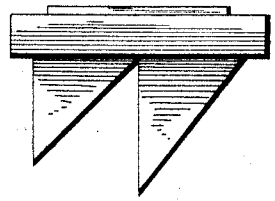
Figure 8:
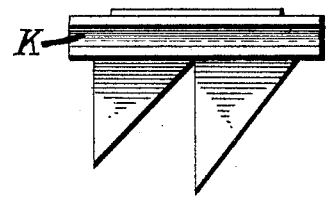
Figure 7:
Figure 7:
Figure 9:
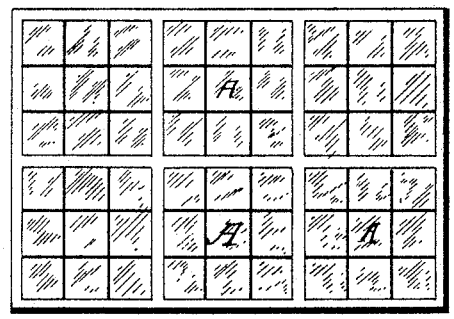

Figure 1 is a plan view of a prism-tile composed of nine prism-tiles. Fig. 2 is a cross-section on the line 2 2 of Fig. 1. Fig. 3 is a cross-section on the line 3 3, Fig. 1; and Fig. 4 is a cross-section on the line 4 4, Fig. 1. Fig. 5 is a view of a single prism-tile. Fig. 6 is a cross-section of a modified electroprism-tile. Fig. 7 is a view of a modification of the net in which the warps running one way are composed of flat strips and those running the other way are composed of wires. Fig. 7' is a cross-section through Fig. 7. Fig. 8 is a view of the modified prism-tile used with the modified net of Fig. 7. Fig. 9 is a view of a prism-pavement composed of prism-tiles.

To illustrate the invention more fully, I have exaggerated the angles and the inclinations of the several parts, but in practice of course these angles and inclinations would be greatly varied, and indeed the illustration here is to be taken as little more than diagrammatic. It is merely to suggest the construction, which will be readily applied to the circumstances of each case by any person skilled in the art.

Like parts are indicated by the same letters in all the figures.

A is the central or key prism-tile; B B, the corner prism-tiles, and C C the intermediate side prism-tiles. These nine tiles are intended to be united together and in such manner as to form an arch, the object being to present the greatest possible surface of glass or transparency and the least surface of supporting metal. In ordinary vault-lights the area of opaque substance, whether metal, concrete, or other supporting and framing material, is very large, and hence a comparatively small amount of light is introduced.

These tiles, arranged preferably in groups of nine, (though of course groups of other numbers could be employed,) are gathered within a frame, preferably a relatively light steel or iron frame, and they are supported in such frame, first, by the fact that they are shaped or placed with reference to each other so as to form an arch, and, secondly, because they are supported by the net or grid. For example, the warps or long members of the net D D are placed in position and similar warps or short ties E E are placed between the prism-tiles running in the opposite direction. The overhanging key-pieces G G serve to keep the members of the net together. Similar warps or ties may be put around the edge, but I prefer, as here shown, to use only the light surrounding frame. The whole may then be placed in the electrolytic bath and treated, preferably, until the union of the several parts is complete and the prism-tiles are united by means of the net and frame into one water and air tight prism-tile plate. In Fig. 7' the features of the net are shown as consisting of flat strips H, with holes I and transverse rods J passed through the holes. The prism-tiles are in this case grooved, as at K, for the reception of the rods or wires J.

L is a surrounding frame which holds the several prism-tiles together to form the prism-pavement. There may be other modifications. These prism-tiles can then be used in suitable metal or other frames to form a prism-pavement in the usual manner in the formation of such pavements.

I have proceeded with this explanation of the invention without regard to the particular formation of the separate tiles. It is possible to use the ordinary tiles without material change in their forms or sizes, but to get the arched effect it would be necessary to incline them more or less, and the result would be a somewhat irregular surface. I think that the surface of the key-tile would be perhaps a quarter of an inch above the outer frame, while the outer edges of the prism-tile C C would be about an eighth of an inch. This irregularity, however, can be obviated by making the tiles of suitable shape, so as to form the flat arch illustrated in Fig. 6, or in any other of the forms well known and in use for making flat arches from tiles in architectural work.

What I claim is—

1. In a pavement, the combination of the pavement-frame with a series of combination-tiles consisting each of several tiles arranged so as to form an arch and adapted to be received in and be supported by the pavement-frame.

2. In a prism-pavement, the combination of the pavement-frame with a series of combination prism-tiles consisting each of several prism-tiles arranged so as to form an arch and adapted to be received in and be supported by the pavement-frame.

3. As a new article of manufacture, a combination-tile consisting of a series of tiles shaped so as to form an arch in combination with a supporting and surrounding frame to hold them together.

4. As a new article of manufacture, a prism-tile comprising a series of prism-tiles shaped so as to form an arch, a surrounding frame to take the stress received by the arch, and an intermediate filling between the prism-tiles.

WILLIAM H. WINSLOW.

Witnesses:
F. W. PARKER,
OLIN H. BASQUIN.